United States Patent [19]

Kondo et al.

[11] Patent Number: 4,839,313

[45] Date of Patent: Jun. 13, 1989

[54] GLAZE COMPOSITIONS FOR CERAMIC SUBSTRATES

[75] Inventors: Kazuo Kondo; Tatsunori Kurachi; Masahiko Okuyama, all of Aichi, Japan

[73] Assignee: NGK Spark Plug Co., Ltd., Aichi, Japan

[21] Appl. No.: 121,831

[22] Filed: Nov. 17, 1987

Related U.S. Application Data

[63] Continuation of Ser. No. 847,480, Apr. 3, 1986, which is a continuation-in-part of Ser. No. 689,690, Jan. 18, 1985, abandoned.

[30] Foreign Application Priority Data

Jan. 9, 1984 [JP] Japan ................................ 59-1694
Jan. 24, 1984 [JP] Japan ................................ 59-10812

[51] Int. Cl.$^4$ .............................................. C03C 8/00
[52] U.S. Cl. ........................................ 501/14; 501/15; 501/16; 501/17; 501/18; 501/64; 501/72; 428/432
[58] Field of Search ............... 501/15, 64, 11, 14, 501/16-18, 50-53, 32, 72; 428/432

[56] References Cited

U.S. PATENT DOCUMENTS

| | | | |
|---|---|---|---|
| 4,256,796 | 3/1981 | Hang et al. | 428/210 |
| 4,282,035 | 8/1981 | Nigrin | 106/48 |
| 4,429,007 | 1/1984 | Bich et al. | 428/389 |
| 4,624,934 | 11/1986 | Kokubu et al. | 501/17 |
| 4,634,634 | 1/1987 | Kondo et al. | 428/432 |

FOREIGN PATENT DOCUMENTS

60-55453 12/1985 Japan.
535237 11/1976 U.S.S.R..

OTHER PUBLICATIONS

*Ceramic Glazes*, Parmelee, C; Industrial Publications, Inc. Chicago, IL. (1951) p. 33.
*Chemical Approach to Glass;* volf., M. Elseuief, NY (1984) pp. 190, 391.

Primary Examiner—William R. Dixon, Jr.
Assistant Examiner—Andrew Griffs
Attorney, Agent, or Firm—Sughrue, Mion, Zinn, Macpeak & Seas

[57] ABSTRACT

Glaze compositions for ceramic substrates such as an alumina substrate are described. In a first embodiment, the glaze composition consists of 55 to 75 mol % $SiO_2$, 1 to 15 mol % $Al_2O_3$, 3 to 20 mol % CaO, 1 to 13 mol % BaO and 0.1 to 5 mol % $Y_2O_3$. In a second embodiment, the glaze composition consists essentially of 55 to 75 mol % $SiO_2$, 1 to 15 mol % $Al_2O_3$, 3 to 20 mol % CaO, 1 to 13 mol % BaO, 1 to 5 mol % $Y_2O_3$, 25 mol % or less SrO, 7 mol % or less $B_2O_3$, 2 mol % or less ZnO and 2 mol % or less MgO. In a third embodiment, the glaze composition consists essentially of 58 to 75 mol % $SiO_2$, 2 to 15 mol % $Al_2O_3$, 0.5 to 5 mol % $La_2O_3$, 2 to 20 mol % CaO and 1 to 13 mol % BaO. In a fourth embodiment, the glaze composition consists essentially of 58 to 75 mol % $SiO_2$, 2 to 15 mol % $Al_2O_3$, 0.5 to 5 mol % $La_2O_3$, 2 to 20 mol % CaO, 1 to 13 mol % BaO, 25 mol % or less SrO, 2 mol % or less MgO, 7 mol % or less $B_2O_3$, and 5 mol % or less $Y_2O_3$. These glaze compositions are suitable for use in surface glazing of ceramic substrates for thermal heads, printer heads, etc.

10 Claims, No Drawings

GLAZE COMPOSITIONS FOR CERAMIC SUBSTRATES

CROSS-RELATED APPLICATION

This is a continuation of application Ser. No. 06/847,480, filed Apr. 3, 1986, which is a continuation-in-part of Ser. No. 06/689,690 filed Jan. 18, 1985, now abandoned.

FIELD OF THE INVENTION

The present invention relates to glaze compositions for ceramic substrates. More particularly, it is concerned with glaze compositions for ceramic substrates which are greatly superior in heat resistance, surface smoothness and matching of the thermal expansion coefficient with ceramic substrates, and are of high reliability even if used repeatedly under severe conditions.

BACKGROUND OF THE INVENTION

Glazed substrates are widely used as thermal heads and printer heads for facsimile systems. As printing speeds have greatly increased in recent years, they are now used under very severe conditions such that the temperature rises and drops abruptly. In order to reduce the size of equipment and to lower production costs, an IC drive circuit has been formed on the glazed substrate, or a step of thick film technology has been used. For this purpose, it is required that the glazed layer have much higher heat resistance, e.g., to be free of any variations even after heat treatment at a temperature of at least 800° C. for a period of about 30 minutes. In conventional glaze compositions, however, alkali oxides or alkali oxides and lead oxide are added thereto since great importance is placed on the smoothness of the glaze surface and/or ease of production. Thus, they usually can withstand only temperatures of at most 600° C.

A so-called high temperature type of glaze substantially free of alkali oxides and lead oxide (which may contain alkali oxides and lead oxide as impurities) was recently developed. This type of glaze, however, can withstand only temperatures in the neighborhood of 700° C. If the heat resistance of the glaze is attempted to be increased, problems arise in that surface smoothness is reduced and the coefficient of thermal expansion drops, resulting in an increase in the expansion difference between the glaze layer and the ceramic substrate.

If there is a large difference in the coefficient of thermal expansion between the glaze and the ceramic substrate, at the time of baking the glaze high stress is formed in the glazed layer. When such a glazed ceramic substrate is used as a thermal head, for example, in a facsimile system, microcracks, for example, are formed in the glazed layer since further thermal stress is applied to the glazed layer under severe conditions when the temperature rises and drops abruptly. Thus, the ultimate glazed ceramic substrate is poor in reliability. It is also known that if there is a large difference in expansion, cracks are formed even at the time of baking and cooling.

SUMMARY OF THE INVENTION

The present invention intends to overcome the above problems of the prior art, and the object of the present invention is to provide a superior glaze composition for ceramic substrates.

The present invention relates to glaze compositions for ceramic substrates containing 55 to 75 mol% of $SiO_2$, 1 to 15 mol% of $Al_2O_3$, 2 to 20 mol% of CaO, 1 to 13 mol% of BaO, and one or more selected from 0.1 to 5 mol% of $Y_2O_3$ and 0.5 to 5 mol% of $La_2O_3$.

There are four preferred embodiments of the present invention:

(1) The first preferred embodiment comprises a glaze composition for a ceramic substrate consisting of 55 to 75 mol% $SiO_2$, 1 to 15 mol% $Al_2O_3$, 3 to 20 mol% CaO, 1 to 13 mol% BaO and 0.1 to 5 mol% of $Y_2O_3$.

(2) The second preferred embodiment of the present invention comprises a glaze composition for a ceramic substrate consisting essentially of 55 to 75 mol% $SiO_2$, 1 to 15 mol% $Al_2O_3$, 3 to 20 mol% CaO, 1 to 13 mol% BaO, 1 to 5 mol% $Y_2O_3$, 25 mol% or less SrO, 7 mol% or less $B_2O_3$, 2 mol% or less ZnO and 2 mol% or less MgO.

(3) The third preferred embodiment of the present invention comprises a glaze composition for a ceramic substrate consisting essentially of 58 to 75 mol% $SiO_2$, 2 to 15 mol% $Al_2O_3$, 0.5 to 5 mol% $La_2O_3$, 2 to 20 mol% CaO and 1 to 13 mol% BaO.

(4) The fourth preferred embodiment of the present invention comprises a glaze composition for a ceramic substrate consisting essentially of 58 to 75 mol% $SiO_2$, 2 to 15 mol% $Al_2O_3$, 0.5 to 5 mol% $La_2O_3$, 2 to 20 mol% CaO, 1 to 13 mol% BaO, 25 mol% or less SrO, 2 mol% or less MgO, 7 mol% or less $B_2O_3$ and 5 mol% or less $Y_2O_3$.

DETAILED DESCRIPTION OF THE INVENTION

Embodiments (1) and (2)

The following discussion pertains to embodiments (1) and (2) of the present invention.

$SiO_2$ is a constituent forming a glass structure. If the $SiO_2$ content is less than 55 mol%, devitrification tends to occur and thus a good glaze is difficult to produce. On the other hand, if it is in excess of 75 mol%, the coefficient of thermal expansion tends to remarkably decrease and, therefore, the ultimate glaze is not suitable for the object of the present invention.

In the glaze composition of the present invention, because it does not substantially contain alkali oxides and lead oxide, $Al_2O_3$ serves to decrease the tendency to devitrification and to improve heat characteristics even if added in small amounts. If, however, the $Al_2O_3$ content is less than 1 mol%, the devitrification tendency becomes marked and thus a good glaze is difficult to produce. On the other hand, if it is in excess of 15 mol%, the frit is difficult to melt and also the glaze surface is difficult to become smooth.

CaO causes the frit to melt easily and also serves to increase water resistance. If, however, the CaO content is less than 3 mol%, the above effects are obtained only insufficiently. On the other hand, if it is in excess of 20 mol%, the devitrification tendency becomes marked and thus a good glaze is difficult to produce.

BaO causes the frit to melt easily and is effective in reducing the devitrification tendency and also in increasing the coefficient of thermal expansion. If, however, the BaO content is less than 1 mol%, the above effects are obtained only insufficiently. On the other hand, if it is in excess of 13 mol%, bubbles are difficult to remove and thus it becomes difficult to produce a smooth glaze surface. Furthermore, heat characteristics are reduced.

$Y_2O_3$ increases the heat resistance of the glaze and also increases the coefficient of thermal expansion of the glaze. Furthermore, it accelerates the removal of bubbles at the time of baking the glaze, thereby providing a smooth glaze surface and is effective in broadening the preferred temperature range for the process of baking the glaze. Moreover, it increases the corrosion resistance of the glaze against an $HF/HNO_3$ mixed solution, which is, for example, used in the case of etching of a thin film layer, and also increases the hardness of the glaze. If, however, the $Y_2O_3$ content is in excess of 5 mol%, the devitrification tendency at the time of baking becomes marked.

At least one of SrO, $B_2O_3$, ZnO and MgO are contained in embodiment (2).

SrO reduces the devitrification tendency and is very effective in forming a good glaze surface. If it is used in combination with BaO, it increases fluidity and permits one to obtain a smooth glaze surface. SrO is effective even if added in small amounts. The greater part of CaO may be replaced with SrO. In this case, the resulting glaze composition is somewhat reduced in heat resistance but increased in surface smoothness. If, however, the SrO content is in excess of 25 mol%, the smoothness of the glaze surface is conversely reduced.

$B_2O_3$ forms a glass structure like $SiO_2$. It is effective in increasing the smoothness of the glaze surface even if added in small amounts. However, as the $B_2O_3$ content is increased, heat characteristics (heat resistance) are reduced and, therefore, it should be added in an amount of 7 mol% or less.

ZnO is effective in increasing the smoothness of the glaze surface. If, however, the ZnO content is in excess of 2 mol%, the devitrification tendency becomes marked.

MgO increases the surface insulation resistance. If, however, the MgO content is in excess of 2 mol%, the state of the glaze surface is deteriorated.

Embodiments (3) and (4)

The following discussion pertains to embodiments (3) and (4) of the present invention.

$SiO_2$ is a constituent forming a glass structure. If the $SiO_2$ content is less than 58 mol%, devitrification tends to occur and thus a good glaze is difficult to produce. On the other hand, if it is in excess of 75 mol%, there is a marked tendency that the coefficient of the thermal expansion is decreased and, therefore, the ultimate glaze is not suitable for the object of the present invention.

In the glaze composition of the present invention, because it does not substantially contain alkali oxides and lead oxide, $Al_2O_3$ serves to decrease the tendency of devitrification and to improve heat characteristics even if added in small amounts. If, however, the $Al_2O_3$ content is less than 2 mol%, the devitrification tendency becomes marked and thus a good glaze is difficult to produce. On the other hand, if it is in excess of 15 mol%, the glaze surface is difficult to become smooth.

$La_2O_3$ increases the coefficient of thermal expansion of the glaze. If, however, the $La_2O_3$ content is less than 0.5 mol%, neither the above effect nor the improvement in heat resistance and surface smoothness is obtained. On the other hand, if the $La_2O_3$ content is in excess of 5 mol%, a devitrification tendency begins to be encountered. Alkali oxides, PbO, or BaO have heretofore been added to increase the coefficient of thermal expansion of a glaze. These compounds, however, decrease the heat resistance of the glaze as compared with that prior to the addition thereof. Conversely, $La_2O_3$ acts not only to increase the heat resistance to a certain extent but also to increase surface smoothness to a certain extent.

CaO causes the frit to melt easily. If, however, the CaO content is less than 2 mol%, the above effect is obtained only insufficiently. On the other hand, if it is in excess of 20 mol%, the devitrification tendency begins to be encountered.

BaO causes the frit to melt easily and is effective in reducing the devitrification tendency and also in increasing the coefficient of thermal expansion. If, however, the BaO content is less than 1 mol%, the above effects are obtained only insufficiently. On the other hand, it is in excess of 13 mol%, a smooth glaze surface is difficult to obtain and heat resistance drops.

At least one of SrO, MgO, $B_2O_3$ and $Y_2O_3$ are contained in embodiment (4).

SrO reduces the devitrification tendency and, furthermore, serves to form a smooth glaze surface. It is effective even if used in small amounts. The greater part of CaO may be replaced with SrO. In this case, although the heat resistance of the glaze composition is somewhat reduced, its surface smoothness is increased. If, however, the SrO content is in excess of 25 mol%, the smoothness of the glaze surface is conversely reduced.

MgO accelerates the removal of bubbles during the process of baking the glaze. If, however, the MgO content is in excess of 2 mol%, the devitrification tendency begins to be encountered.

$B_2O_3$ greatly increases the smoothness of the glaze surface and also reduces the devitrification tendency even if added in small amounts. However, as the $B_2O_3$ content is increased, heat resistance is reduced. Thus, it should be added in an amount of 7 mol% or less.

$Y_2O_3$ increases the heat resistance of the glaze and also increases the coefficient of thermal expansion of the glaze. Furthermore, it accelerates the removal of bubbles at the time of baking the glaze, thereby providing a smooth glaze surface and is effective in broadening the preferred temperature range for the process of baking the glaze. Moreover, it increases the corrosion resistance of the glaze against an $HF/HNO_3$ mixed solution, which is, for example, used in the case of etching of a thin film layer, and also the hardness of the glaze. If, however, the $Y_2O_3$ content is in excess of 5 mol%, the devitrification tendency at the time of baking becomes marked.

The glaze compositions of the present invention do not substantially contain alkali oxides and lead oxide, which may contain alkali oxides and lead oxide as impurities. The total amount of alkali oxides such as $Na_2O$ or $K_2O$ present as impurities in the glaze compositions of the present invention must be less than 0.1 wt% and the amount of lead oxide such as PbO present as impurities in the glaze compositions of the present invention must be less than 0.01 wt%.

It is usually said that alumina is most desirable as a substrate material to be used in production of a thermal head from viewpoints of, e.g., mechanical strength, thermal conductivity, and cost. The glaze composition of the present invention (all embodiments) is very suitable for use in combination with alumina in respect of characteristics such as a coefficient of thermal expansion.

The glaze made from the glaze compositions of the present invention has a coefficient of thermal expansion of at least $6.0 \times 10^{-6}/°C$.

The present invention (all embodiments) is described in greater detail with reference to the following nonlimitative examples.

EXAMPLE 1

$SiO_2$, $Al(OH)_3$, $CaCO_3$, $BaCO_3$, $Y_2O_3$, $SrCO_3$, $H_3BO_3$, ZnO, $MgCO_3$, $Na_2CO_3$, $K_2CO_3$, and $Pb_3O_4$ were weighed out to prepare compositions as shown in Table 1 (determined after melting), mixed in a triturator (i.e., a grinder), melted in a platinum crucible at a temperature of 1,450° C., and the poured into water to produce a glass block. This glass block was finely pulverized in an alumina ball mill to an extent that a mean grain size is 3 to 5 μm. In this way, glaze compositions of the present invention (Nos. 1 to 8) were prepared. For comparison, comparative glaze compositions (Nos. 9 and 10) were also prepared.

Glaze compositions Nos. 1 to 10 were measured for heat characteristics. The results are shown in Table 2.

The above glaze compositions Nos. 1 to 10 were each mixed with an ethyl cellulose-based binder (5% by weight) to prepare a paste. This paste was coated on a 50×50×1 (mm) alumina substrate ($Al_2O_3$; 97% by weight) and baked at a temperature of 1,200° to 1,250° C. for a period of 2 hours to produce a glazed ceramic substrate. For evaluation of heat resistance, the glazed ceramic substrates were subjected to heating at a temperature of 800° C. in the atmosphere for a period of 30 minutes and, thereafter, the surface of the substrates was observed.

In the glazed ceramic substrates produced using the glaze compositions of the present invention (Nos. 1 to 8), no abnormality was observed. In the case of the ceramic substrate coated with glaze composition No. 9 (comparative example), the edge of the substrate became round as a result of softening and deformation of the glaze. In the case of the ceramic substrate coated with glaze composition No. 10 (comparative example), cracks were formed in the glaze on the surface of the ceramic substrate.

EXAMPLE 2

$SiO_2$, $Al(OH)_3$, $La_2O_3$, $CaCO_3$, $BaCO_3$, $SrCO_3$, $MgCO_3$, $H_3BO_3$, $Y_2O_3$, $Na_2CO_3$, $K_2CO_3$ and $Pb_3O_4$ were weighed out to prepare compositions as shown in Table 3 (determined after melting), mixed in a triturator, melted in a platinum crucible at a temperature of 1,450° C., and then poured into water to produce a glass block. This glass block was finely pulverized in an alumina ball mill to an extent that a mean grain size is 3 to 5 μm. In this way, glaze compositions of the present invention (Nos. 1 to 8) were prepared. For comparison, comparative glaze compositions (Nos. 9 to 14) were also prepared.

Glaze compositions Nos. 1 to 14 were measured for heat characteristics. The results are shown in Table 4.

TABLE 1

| Run No. | Composition (mol %) | | | | | | | | | | | | Remarks |
|---|---|---|---|---|---|---|---|---|---|---|---|---|---|
| | $SiO_2$ | $Al_2O_3$ | CaO | BaO | $Y_2O_3$ | SrO | $B_2O_3$ | MgO | ZnO | $Na_2O$ | $K_2O$ | PbO | |
| 1 | 67 | 6 | 16.5 | 6.5 | 4 | — | — | — | — | — | — | — | Example of the present invention |
| 2 | 64 | 10.5 | 18 | 6.5 | 1 | — | — | — | — | — | — | — | Example of the present invention |
| 3 | 63 | 8 | 15.7 | 9 | 1 | 2 | 1 | 0.3 | — | — | — | — | Example of the present invention |
| 4 | 63 | 8 | 15.7 | 7 | 3 | 2 | 1 | 0.3 | — | — | — | — | Example of the present invention |
| 5 | 60 | 8 | 8 | 4 | 3 | 15 | 2 | — | — | — | — | — | Example of the present invention |
| 6 | 60 | 7 | 15 | 5 | 2 | 10 | 1 | — | — | — | — | — | Example of the present invention |
| 7 | 70 | 5 | 3 | 1.7 | 1 | 17 | 2 | 0.3 | — | — | — | — | Example of the present invention |
| 8 | 65 | 5 | 16 | 9 | 1 | 2 | 1 | — | 1 | — | — | — | Example of the present invention |
| 9 | 58 | 3 | 6 | 7 | — | — | 16 | 1 | — | 1 | 1 | 7 | Comparative example |
| 10 | 68 | 8 | 17.7 | 2 | — | — | 4 | 0.3 | — | — | — | — | Comparative example |

TABLE 2

| Run No. | Heat Characteristics | | |
|---|---|---|---|
| | Yield[1] Point (°C.) | Softening[2] Point (°C.) | Coefficient of[3] Thermal Expansion (× $10^{-6}$/°C.) |
| 1 | 820 | 1,030 | 6.4 |
| 2 | 800 | 974 | 6.2 |
| 3 | 830 | 960 | 6.3 |
| 4 | 850 | 975 | 6.5 |
| 5 | 820 | 940 | 6.5 |
| 6 | 815 | 958 | 6.7 |
| 7 | 810 | 1,020 | 6.0 |
| 8 | 800 | 955 | 6.7 |
| 9 | 600 | 770 | 6.0 |
| 10 | 770 | 970 | 5.1 |

Note:
[1]Yield point
The glaze composition was molded in a cylinder 20 mm in length and 5 mm in diameter and measured for thermal expansion. The temperature corresponding to the vertex of the expansion curve was referred to as the "yield point".
[2]Softening point
The temperature corresponding to the second heat absorption peak in a differential thermal analysis was referred to as the "softening point".
[3]Coefficient of thermal expansion
The coefficient of thermal expansion was calculated from the difference in thermal expansion between room temperature and 400° C.

TABLE 3

| Run No. | Composition (mol %) | | | | | | | | | | | | Remarks |
|---|---|---|---|---|---|---|---|---|---|---|---|---|---|
| | $SiO_2$ | $Al_2O_3$ | $La_2O_3$ | CaO | BaO | SrO | MgO | $B_2O_3$ | $Y_2O_3$ | $Na_2O$ | $K_2O$ | PbO | |
| 1 | 67.5 | 6.5 | 3.0 | 17.5 | 5.5 | — | — | — | — | — | — | — | Example of the present invention |
| 2 | 61.9 | 9.8 | 4.0 | 18.0 | 6.3 | — | — | — | — | — | — | — | Example of the present invention |
| 3 | 69.4 | 4.9 | 2.9 | 16.0 | 5.6 | — | 0.3 | 0.9 | — | — | — | — | Example of the present invention |
| 4 | 61.5 | 4.1 | 2.9 | 6.7 | 1.8 | 18.2 | 0.3 | 4.5 | — | — | — | — | Example of the present invention |
| 5 | 67.1 | 5.9 | 1.1 | 3.1 | 3.7 | 17.8 | 0.3 | 1.0 | — | — | — | — | Example of the present invention |
| 6 | 62.8 | 8.8 | 2.9 | 16.5 | 4.8 | 3.0 | 0.3 | 0.9 | — | — | — | — | Example of the present invention |
| 7 | 68.0 | 4.9 | 0.9 | 16.4 | 5.5 | — | 0.3 | 1.0 | 3.0 | — | — | — | Example of the present invention |
| 8 | 65.9 | 5.8 | 1.5 | 3.1 | 3.5 | 17.5 | 0.3 | 0.9 | 1.5 | — | — | — | Example of the present invention |
| 9 | 69.1 | 7.3 | — | 16.6 | 3.6 | 2.1 | 0.8 | — | 0.5 | — | — | — | Comparative example |
| 10 | 57 | 3 | — | 6 | 4 | — | 1 | 16 | — | 4 | 1 | 8 | Comparative example |
| 11 | 68.2 | 9.8 | 4.0 | 18.0 | — | — | — | — | — | — | — | — | Comparative example |
| 12 | 73.5 | 4.9 | 0.9 | 16.4 | — | — | 0.3 | 1.0 | 3.0 | — | — | — | Comparative example |
| 13 | 68.0 | 10.4 | 0.9 | 16.4 | — | — | 0.3 | 1.0 | 3.0 | — | — | — | Comparative example |
| 14 | 65.9 | 9.3 | 1.5 | 3.1 | — | 17.5 | 0.3 | 0.9 | 1.5 | — | — | — | Comparative example |

TABLE 4

| | Heat Characteristics | | |
|---|---|---|---|
| Run No. | Yield[1] Point (°C.) | Softening[2] Point (°C.) | Coefficient of[3] Thermal Expansion ($\times 10^{-6}/$°C.) |
| 1 | 810 | 999 | 6.2 |
| 2 | 802 | 958 | 6.5 |
| 3 | 800 | 1,010 | 6.3 |
| 4 | 751 | 958 | 6.7 |
| 5 | 782 | 973 | 6.3 |
| 6 | 801 | 961 | 6.2 |
| 7 | 813 | 1,040 | 6.0 |
| 8 | 801 | 972 | 6.5 |
| 9 | 790 | 958 | 5.2 |
| 10 | 660 | 800 | 5.5 |
| 11 | 888 | 1,000 | 5.2 |
| 12 | — | devitrification | — |
| 13 | 900 | 1,022 | 4.7 |
| 14 | 876 | 1,000 | 5.6 |

Note:
[1] Yield point
The temperature corresponding to the first heat absorption peak in a differential thermal analysis was referred to as the "yield point".
[2] Softening point
Same as defined for Example 1.
[3] Coefficient of thermal expansion
Same as defined for Example 1.

The above glaze compositions Nos. 1 to 14 were each mixed with an ethyl cellulose-based binder (5% by weight) to prepare a paste. This paste was coated on a 50×50×1 (mm) alumina substrate ($Al_2O_3$; 97% by weight) and baked at a temperature of 1,180° to 1,250° C. for a period of 2 hours to produce a glazed ceramic substrate. For evaluation of heat resistance, the glazed ceramic substrates were subjected to heating at a temperature of 800° C. in the atmosphere for a period of 30 minutes and, thereafter, the surface of the substrates was observed.

In the glazed ceramic substrates produced using the glaze compositions of the present invention (Nos. 1 to 8), no abnormality was observed. In the ceramic substrate coated with glaze composition No. 9 (comparative example), the edge of the substrate became round as a result of softening and deformation of the glaze. In the case of the ceramic substrate coated with glaze composition No. 10 (comparative example), cracks were formed in the glaze on the surface of the ceramic substrate.

The glaze composition Nos. 11 and 12 (comparative examples), respectively, had the same composition as the glaze composition Nos. 2 and 7, except they did not contain BaO and, therefore, the content of $SiO_2$ was increased by an amount corresponding to that of the BaO of composition Nos. 2 and 7. Composition Nos. 11 and 12 contain ranges similar to the composition range described in U.S.S.R. Inventors' Certificate No. 535,237 (Bystrova et al).

The glaze composition Nos. 13 and 14 (comparative examples), respectively, had the same composition as the glaze composition Nos. 7 and 8, except they did not contain BaO and, therefore, the content of the $Al_2O_3$ was increased by an amount corresponding to that of the BaO of composition Nos. 7 and 8. Composition Nos. 13 and 14 contain ranges similar to the composition range described in U.S.S.R. Inventors' Certificate No. 535,237 (Bystrova et al).

The glaze compositions Nos. 11, 12, 13 and 14 were either infusible or difficultly fusible. The glazed ceramic substrates produced using the glaze compositions had considerably low coefficient of thermal expansion.

The glaze composition of the present invention, as described above, is suitable for surface glazing of ceramic substrates of thermal heads, printer heads, and so forth. In addition, it can be used as a sealing material.

The following Tables 1' and 3' are identical to above Tables 1 and 3, except for including within the Tables corresponding weight percentage values for each mole percent value.

TABLE 1'

| Run No. | SiO$_2$ | Al$_2$O$_3$ | CaO | BaO | Y$_2$O$_3$ | SrO | B$_2$O$_3$ | MgO | ZnO | Na$_2$O | K$_2$O | PbO | Remarks |
|---|---|---|---|---|---|---|---|---|---|---|---|---|---|
| 1 | 67 (53.93) | 6 (8.19) | 16.5 (12.41) | 6.5 (13.36) | 4 (12.11) | — | — | — | — | — | — | — | Example of the present invention |
| 2 | 64 (53.79) | 10.5 (14.97) | 18 (14.13) | 6.5 (13.95) | 1 (3.16) | — | — | — | — | — | — | — | Example of the present invention |
| 3 | 63 (51.31) | 8 (11.05) | 15.7 (11.94) | 9 (18.72) | 1 (3.06) | 2 (2.81) | 1 (0.94) | 0.3 (0.16) | — | — | — | — | Example of the present invention |
| 4 | 63 (50.32) | 8 (10.84) | 15.7 (11.71) | 7 (14.28) | 3 (9.01) | 2 (2.76) | 1 (0.93) | 0.3 (0.16) | — | — | — | — | Example of the present invention |
| 5 | 60 (45.90) | 8 (10.38) | 8 (5.72) | 4 (7.81) | 3 (8.63) | 15 (19.79) | 2 (1.77) | — | — | — | — | — | Example of the present invention |
| 6 | 60 (48.16) | 7 (9.53) | 15 (11.52) | 5 (10.25) | 2 (6.04) | 10 (13.85) | 1 (0.93) | — | — | — | — | — | Example of the present invention |
| 7 | 70 (57.74) | 5 (7.00) | 3 (2.31) | 1.7 (3.58) | 1 (3.10) | 17 (24.19) | 2 (1.91) | 0.3 (0.17) | — | — | — | — | Example of the present invention |
| 8 | 65 (53.66) | 5 (7.00) | 16 (12.34) | 9 (18.98) | 1 (3.10) | 2 (2.85) | 1 (0.96) | — | 1 (1.12) | — | — | — | Example of the present invention |
| 9 | 58 (43.15) | 3 (3.79) | 6 (4.17) | 7 (13.3) | — | — | 16 (13.80) | 1 (0.50) | — | 1 (0.77) | 1 (1.17) | 7 (19.36) | Comparative example |
| 10 | 68 (62.93) | 8 (12.56) | 17.7 (15.30) | 2 (4.73) | — | — | 4 (4.29) | 0.3 (0.19) | — | — | — | — | Comparative example |

*¹The parenthesized value represents a weight percentage.

TABLE 3'

| Run No. | SiO$_2$ | Al$_2$O$_3$ | La$_2$O$_3$ | CaO | BaO | SrO | MgO | B$_2$O$_3$ | Y$_2$O$_3$ | Na$_2$O | K$_2$O | PbO | Remarks |
|---|---|---|---|---|---|---|---|---|---|---|---|---|---|
| 1 | 67.5 (53.92) | 6.5 (8.81) | 3.0 (13.00) | 17.5 (13.06) | 5.5 (11.22) | — | — | — | — | — | — | — | Example of the present invention |
| 2 | 61.9 (46.50) | 9.8 (12.49) | 4.0 (16.30) | 18.0 (12.63) | 6.3 (12.09) | — | — | — | — | — | — | — | Example of the present invention |
| 3 | 69.4 (56.00) | 4.9 (6.71) | 2.9 (12.69) | 16.0 (12.06) | 5.6 (11.54) | — | 0.3 (0.16) | 0.9 (0.84) | — | — | — | — | Example of the present invention |
| 4 | 61.5 (46.64) | 4.1 (5.28) | 2.9 (11.93) | 6.7 (4.75) | 1.8 (3.49) | 18.2 (23.81) | 0.3 (0.15) | 4.5 (3.95) | — | — | — | — | Example of the present invention |
| 5 | 67.1 (52.63) | 5.9 (7.85) | 1.1 (4.68) | 3.1 (2.27) | 3.7 (7.41) | 17.8 (24.08) | 0.3 (0.16) | 1.0 (0.91) | — | — | — | — | Example of the present invention |
| 6 | 62.8 (49.23) | 8.8 (11.71) | 2.9 (12.33) | 16.5 (12.08) | 4.8 (9.61) | 3.0 (4.06) | 0.3 (0.16) | 0.9 (0.82) | — | — | — | — | Example of the present invention |
| 7 | 68.0 (55.19) | 4.9 (6.75) | 0.9 (3.96) | 16.4 (12.43) | 5.5 (11.4) | — | 0.3 (0.16) | 1.0 (0.94) | 3.0 (9.15) | — | — | — | Example of the present invention |
| 8 | 65.9 (49.63) | 5.8 (7.41) | 1.5 (6.13) | 3.1 (2.18) | 3.5 (6.73) | 17.5 (22.73) | 0.3 (0.15) | 0.9 (0.79) | 1.5 (4.25) | — | — | — | Example of the present invention |
| 9 | 69.1 (61.57) | 7.3 (11.04) | — | 16.6 (13.82) | 3.6 (8.19) | 2.1 (3.23) | 0.8 (0.48) | — | 0.5 (1.68) | — | — | — | Comparative example |
| 10 | 57 (43) | 3 (3.84) | — | 6 (4.23) | 4 (7.71) | — | 1 (0.51) | 16 (13.99) | — | 4 (3.12) | 1 (1.18) | 8 (22.43) | Comparative example |
| 11 | 68.2 (55.29) | 9.8 (13.48) | 4.0 (17.59) | 18.0 (13.63) | — | — | — | — | — | — | — | — | Comparative example |
| 12 | 73.5 (64.11) | 4.9 (7.25) | 0.9 (4.26) | 16.4 (13.36) | — | — | 0.3 (0.18) | 1.0 (1.01) | 3.0 (9.84) | — | — | — | Comparative example |
| 13 | 68.0 (57.39) | 10.4 (14.89) | 0.9 (4.12) | 16.4 (12.93) | — | — | 0.3 (0.17) | 1.0 (0.98) | 3.0 (9.52) | — | — | — | Comparative example |
| 14 | 65.9 (50.78) | 9.3 (12.16) | 1.5 (6.27) | 3.1 (2.23) | — | 17.5 (23.26) | 0.3 (0.16) | 0.9 (0.80) | 1.5 (4.35) | — | — | — | Comparative example |

*¹The parenthesized value represents a weight percentage.

While the invention has been described in detail and with reference to specific embodiments thereof, it will be apparent to one skilled in the art that various changes and modifications can be made therein without departing from the spirit and scope thereof.

What is claimed is:

1. A glaze composition for a ceramic substrate consisting essentially of 55 to 75 mol% SiO$_2$, 1 to 15 mol% Al$_2$O$_3$, 3 to 20 mol% CaO, 1 to 13 mol% BaO, 1 to 5 mol% Y$_2$O$_3$, 0 to 25 mol% SrO, 0 to 7 mol% B$_2$O$_3$, 0 to 2 mol% ZnO, and 0 to 2 mol% MgO, and containing at least one of SrO, B$_2$O$_3$, ZnO and MgO.

2. A glaze composition as claimed in claim 1, wherein the ceramic substrate is an alumina substrate.

3. A glaze composition as claimed in claim 1, containing at least one of 2 to 25 mol% SrO, 1 to 7 mol% B$_2$O$_3$, 1 to 2 mol% ZnO and 0.3 to 2 mol% MgO.

4. A glaze composition for a ceramic substrate consisting essentially of 58 to 75 mol% SiO$_2$, 2 to 15 mol% Al$_2$O$_3$, 0.5 to 5 mol% La$_2$O$_3$, 2 to 20 mol% CaO, 1 to 13 mol% BaO, 0 to 25 mol% SrO, 0 to 2 mol% MgO, 0 to 7 mol% B$_2$O$_3$ and 0 to 5 mol% Y$_2$O$_3$, and containing at least one of SrO, MgO, B$_2$O$_3$ and Y$_2$O$_3$.

5. A glaze composition as claimed in claim 4, wherein the ceramic substrate is an alumina substrate.

6. A glaze composition as in claim 4 containing at least one of 3.0 to 25 mol% SrO, 0.3 to 2 mol% MgO, 0.9 to 7 mol% B$_2$O$_3$, and 1.5 to 5 mol% Y$_2$O$_3$.

7. A glaze composition for a ceramic substrate consisting essentially of 55 to 75 mol% SiO$_2$, 1 to 15 mol% Al$_2$O$_3$, 3 to 20 mol% CaO, 1 to 13 mol% BaO, 1 to 5 mol% Y$_2$O$_3$, 0 to 25 mol% SrO, 0 to 2 mol% ZnO, and containing at least one of SrO and ZnO.

8. A glaze composition for a ceramic substrate consisting essentially of 58 to 75 mol% $SiO_2$, 2 to 15 mol% $Al_2O_3$, 0.5 to 5 mol% $La_2O_3$, 2 to 20 mol% CaO, 1 to 13 mol% BaO, 0 to 25 mol% SrO, and 0 to 5 mol% $Y_2O_3$, and containing at least one of SrO and $Y_2O_3$.

9. A ceramic substrate having thereon a coating of a glaze composition of claim 1.

10. A ceramic substrate having thereon a coating of a glaze composition of claim 4.

* * * * *